Patented Sept. 12, 1950

2,521,897

UNITED STATES PATENT OFFICE 2,521,897

METHOD OF PREPARING ACETO ACETIC ACID ESTERS OF CELLULOSE

John R. Caldwell, Kingsport, Tenn., assignor to Eastman Kodak Company, Rochester, N. Y., a corporation of New Jersey No Drawing. Application April 30, 1947,
Serial No. 745,099

4 Claims. (Cl. 260—225)

This invention relates to the preparation of esters of aceto acetic acid by reacting upon partial cellulose esters with diketene in the presence of a tertiary organic base.

Cellulose has previously been treated with diketene, but under the conditions described, such as the use of acid catalysts or high temperatures to promote the reaction, either rapid decomposition of the diketene or difficulty of controlling the reaction occurs. For instance, in some of the prior art processes the reaction proceeded either very rapidly or not at all. The prior art recognizes that in many of these reactions which have been exothermic in character, the removal of the reaction heat has been necessary in order to get any kind of a product.

An object of my invention is to provide a method of reacting diketene with a partial cellulose ester. Another object of my invention is to provide a method of reacting diketene and partial cellulose esters in which the reaction is readily controlled and decomposition of diketene is minimized. A further object of my invention is to provide a method for introducing aceto acetyl radicals into partial esters of cellulose. A still further object of my invention is to provide new derivatives of cellulose containing both aceto acetate radicals and lower fatty acid radicals. Other objects of my invention will appear herein.

These objects of my invention are accomplished by carrying out the reaction between diketene and the partial cellulose ester using a tertiary organic base, such as pyridine as the catalyst, and at a temperature within the range of 25–40° C. I have found that by carrying out the esterification reaction in this manner the reaction takes place at a relatively low velocity, and the formation of decomposition products and the extent of secondary reactions is reduced to a minimum. The preparation of diketene is accomplished by the polymerization of two molecules of ketene as described in the prior art, such as in the article by Boese, Ind. and Eng. Chem. 32, 16 (1940).

The partial cellulose esters which may be esterified by my process are preferably the lower fatty acid esters of cellulose having an acyl content of 20–41%. These may be cellulose acetates, cellulose propionates, cellulose butyrates or mixed esters such as cellulose acetate propionate and cellulose acetate butyrate. In general, the cellulose esters employed should contain from 1.5 to 2.5 acyl radicals per glucose unit, these being the only substituents upon the hydroxyl groups.

The catalyst employed is a tertiary organic base, such as pyridine, alpha picoline, beta picoline, quinoline, or the like. In the reaction it is ordinarily desirable to employ from 0.5–10% of pyridine, based on the weight of the hydroxy compound. In most cases not more than 2% of catalyst is sufficient to promote the reaction. It is ordinarily desirable in esterifying the partial cellulose esters to first either dissolve the cellulose ester in a solvent or suspend it in a non-solvent and then treat the cellulose ester with diketene in the presence of the tertiary organic base. If the reaction is carried out in a homogeneous system, some of the solvents which may be employed are dioxane, chloroform, methylene chloride, ethylene chloride, or the like, the selection of the solvent to be employed depending upon the solubility properties of the cellulose ester which is used. As the reaction takes place on hydroxy compounds, it is desirable that the solvent employed be of a non-hydroxyl type unless an ester both of cellulose and of alcohol is desired as a product of the reaction. If desired, the reaction may be carried out in a heterogeneous system using a liquid in which the cellulose ester may be suspended and which is also a non-solvent for the final product, such, for example, as benzene, isopropyl ether, and the like. Obviously, the reaction may also be carried out in a liquid which is a non-solvent for the partial cellulose ester but is a solvent for the final product. It is desirable that the temperature be maintained within the range of 25–40° C. Although higher or lower temperatures may be used, I have found that within the preferred temperature range the reaction has a suitable velocity and is readily controlled. Also, decomposition of the diketene is minimized when the temperature is kept below 40° C. It is preferred that the diketene be employed in excess, such as 50–100% excess over that required to react with the hydroxyls of the cellulose ester. In the esterification of the cellulose partial ester that material is allowed to stand in the reaction medium with the diketene and catalyst and the temperature is maintained within in the desired range by means of a water bath or other suitable cooling means. The reaction ordinarily is completed within 5 to 10 hours depending upon the cellulose ester which is treated, the temperature which is employed, and the conditions of operation.

The following examples illustrate my invention:

*Example 1.*—15 g. of cellulose acetate having an acetyl content of 34.7% were dried at 110° C. and suspended in 100 cc. of ethylene dichloride. 2 cc. of pyridine were added, and the mixture was cooled to 15–20° C. 15 cc. of diketene were added, and the vessel was placed in a water bath which maintained a temperature of 25–30° C. The reaction occurred as shown by the evolution of heat and the gradual dissolving of the cellulose ester. After standing for 6–8 hours, a clear dope was obtained. The resulting product, cellulose acetate-aceto acetate was precipitated in methyl alcohol in the form of fibrous flakes, washed with methyl alcohol, then with water, and then dried. The resulting product was soluble in acetone to form dopes which could be coated to give clear, tough films or sheets. Analysis indicated that the ester obtained contained approximately 34% acetyl and 9% aceto acetyl. The product was found to be useful as a plastic film base, transparent sheet for wrapping purposes, and other like applications. It was characterized by a solubility in a wide range of solvents and a high degree of compatibility of plasticizers.

Example 2.—15 g. of dry cellulose acetate having an acetyl content of 34.5% were suspended in 100 cc. of isopropyl ether. 10 g. of diketene and 1 cc. of pyridine were mixed in. The mixture was allowed to stand for six hours at 25–30° C. The cellulose ester flakes did not change in appearance. At the end of six hours the ether was decanted off, and the product was washed with water. A mixed cellulose acetate-aceto acetate was obtained having an aceto acetyl content of approximately 10%. The ester obtained was soluble in acetone, ethylene dichloride, and chloroform.

Example 3.—20 g. of cellulose dipropionate were dissolved in 120 cc. of dry dioxane. 20 g. of diketene and 1 cc. of pyridine were added to the solution. The mass was held at a temperature of 28–30° for twelve hours. The product obtained was precipitated in water and washed. Analysis showed that the product was essentially a cellulose dipropionate mono aceto acetate. It was found to be useful as a film base.

I claim:
1. Cellulose acetate-aceto acetate.
2. A method of preparing aceto acetic acid esters of cellulose which comprises heating together at 25–40° C. a lower fatty acid ester of cellulose having free and esterifiable hydroxyl groups and diketene with 0.5–10%, based on the lower fatty acid ester of cellulose, of a tertiary nitrogen base whereby the free hydroxyl groups of the lower fatty acid ester of cellulose are replaced by aceto-acetyl groups.
3. A method of preparing cellulose esters containing aceto acetic acid ester groups which comprises heating together at 25–40° C. a lower fatty acid ester of cellulose containing free and esterifiable hydroxyl groups and diketene with 0.5–10%, based on the lower fatty acid ester of cellulose, of pyridine whereby the free hydroxyl groups of the lower fatty acid ester of cellulose are replaced by aceto-acetyl groups.
4. A method of preparing cellulose acetate-acetoacetate which comprises heating together at 25–40° C. cellulose acetate having free and esterifiable hydroxyl groups and diketene with 0.5–10% of pyridine whereby the free hydroxyl groups of the cellulose acetate are replaced by aceto-acetyl groups.

JOHN R. CALDWELL.

REFERENCES CITED

The following references are of record in the file of this patent:

UNITED STATES PATENTS

| Number | Name | Date |
|---|---|---|
| 1,900,871 | Staud et al. | Mar. 7, 1933 |
| 2,053,280 | Fothergill et al. | Sept. 8, 1936 |
| 2,103,505 | Wiezevich et al. | Dec. 28, 1937 |
| 2,228,452 | Gleason | Jan. 14, 1941 |

OTHER REFERENCES

Ser. No. 340,838, Pohl et al. (A. P. C.) published June 1, 1943.